Dec. 4, 1956 W. D. HARBAUGH 2,772,583
TRANSMISSIONS
Filed June 13, 1952 3 Sheets-Sheet 2
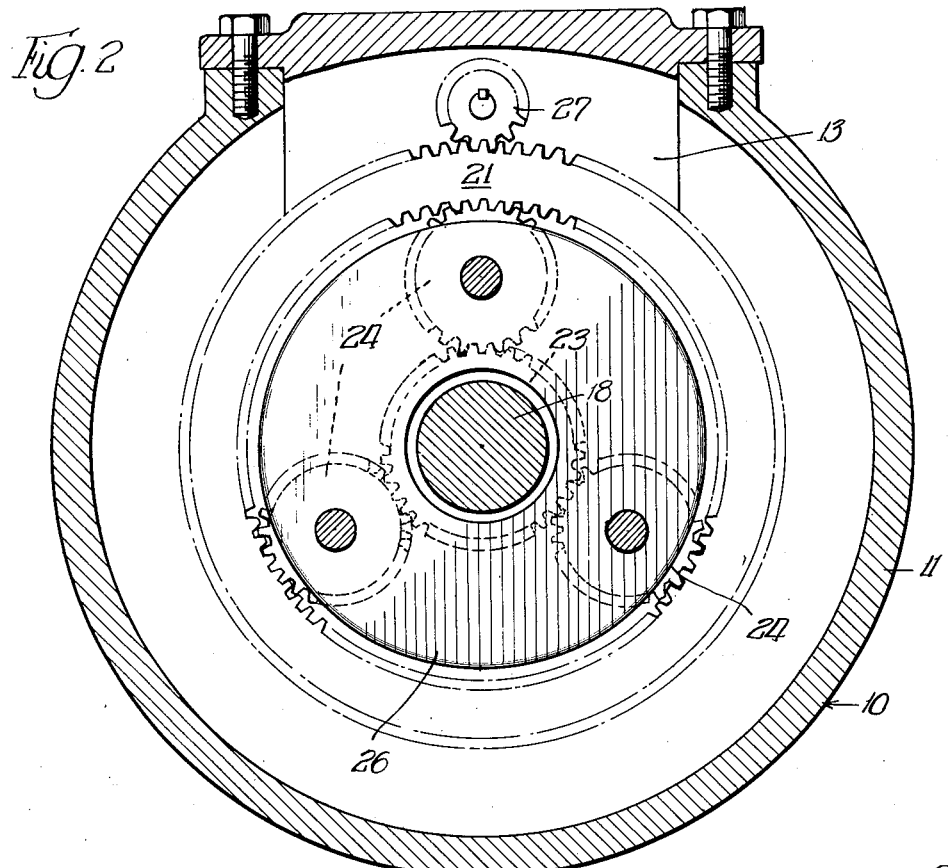
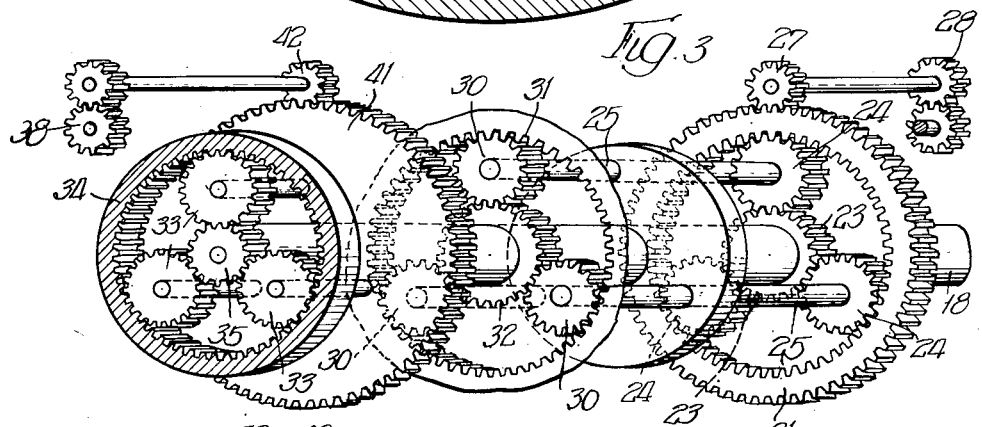
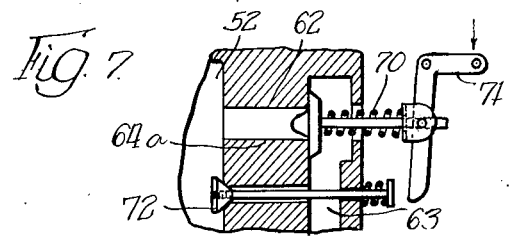
INVENTOR.

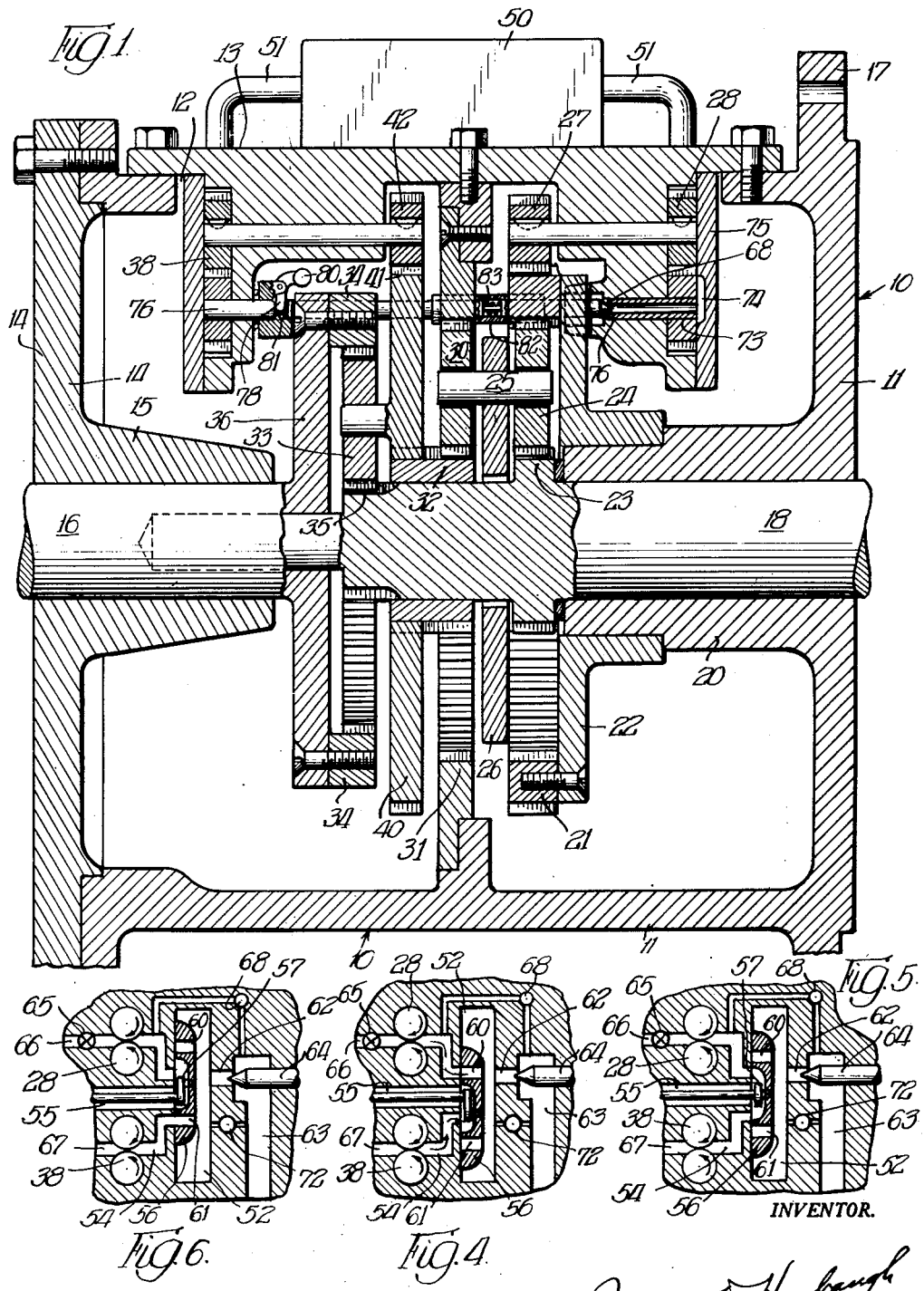

Dec. 4, 1956 W. D. HARBAUGH 2,772,583
TRANSMISSIONS
Filed June 13, 1952. 3 Sheets-Sheet 3
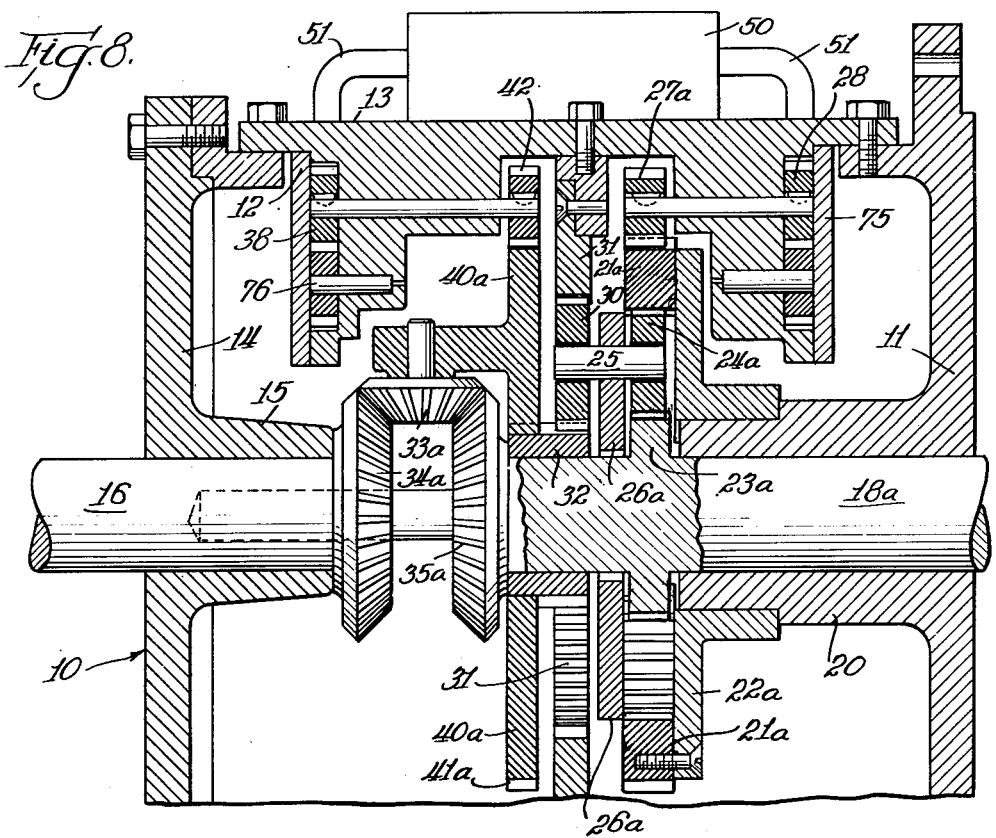
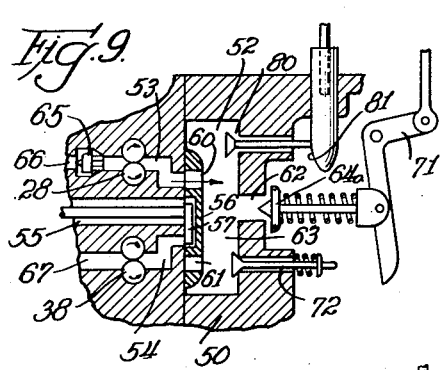
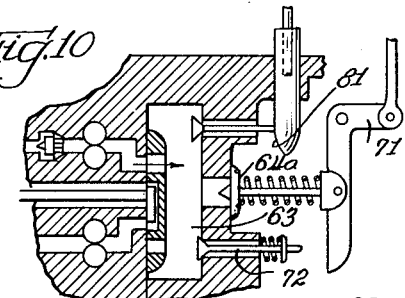
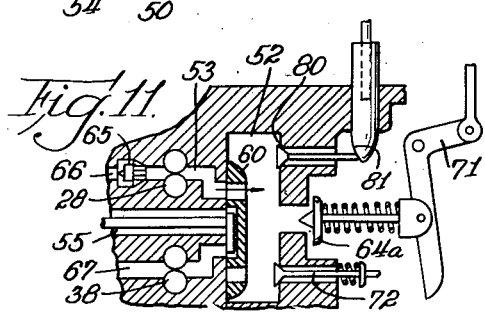
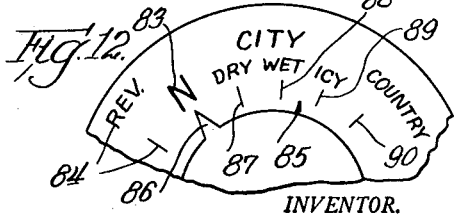
INVENTOR.

United States Patent Office 2,772,583
Patented Dec. 4, 1956

2,772,583

TRANSMISSIONS

Watson D. Harbaugh, Evanston, Ill.

Application June 13, 1952, Serial No. 293,348

24 Claims. (Cl. 74—758)

This invention relates generally to transmissions and more particularly to an improved hydraulically controlled positive drive transmission whose overall ratio may be infinitely varied through both forward and reverse speeds.

This application is a continuation in part application of my parent application Serial No. 138,228, filed January 12, 1950, now abandoned.

The transmission of this invention is primarily intended for use in conjunction with drive and driven shafts whose torque and speed factors vary over wide ranges as is the case with motor vehicles driven by internal combustion engines, but it may be used to an advantage in other applications where infinite speed variation and reversing characteristics are desired.

One object of this invention is to provide a compact relatively simple automatic transmission which provides variable speed reduction for both forward and reverse drive.

Another object is to provide an automatic transmission which may be connected directly to the engine and the propeller shaft without the necessity of a clutch.

Another object is to provide a transmission which may be simply controlled by the accelerator pedal to provide the optimum gear ratio for the torque-speed load on the engine which can be set on a test block under simulated conditions or in an automobile under operating conditions.

Another object is to provide a transmission which is simple to manufacture and which may be readily modified to provide over- or under-drive according to whether the vehicle is to be driven primarily in flat or mountainous country.

Another object of the invention is to provide a transmission which can be utilized with a conventional gear ratio in the driving axle and afford an "over-drive" characteristic which is either automatic or selective, or both, in addition to accomplishing the "standard" drive characteristic originally expected with the conventional gear ratio present in the driving axle.

Another object of the invention is to provide a transmission for automobiles which will not jerk, or pulse as the automobile is brought up to engine speed, nor creep while the engine is idling, nor stall the engine at idling speeds.

A further object resides in the relationship of the parts in which all gears are continuously in mesh and are so arranged that they work in torque and dynamic balance for smooth and positive operation.

Another object is to provide a transmission which may be rapidly changed from forward to reverse, if desired, even when the vehicle is moving forward at a high speed, without damage to the parts thereof, and which will thereafter automatically reduce the speed of the vehicle at the maximum safe rate when so shifted, finally causing the vehicle to come to a smooth stop and then proceed in the opposite direction.

The invention is also characterized by the simplicity of construction which enables quick assembly, testing and repairing.

A further object of the invention is to provide a transmission which permits the engine to operate at a speed selected at will by the operator, and the transmission automatically applies an increasing torque upon the driven shaft as the driven shaft accelerates.

A further object of the invention is to provide a transmission in which the torque transmitted is controlled in direct relationship with the speed of the driven shaft even throughout the higher speeds.

A further object of the invention is to provide a transmission which at high speeds provides for an automobile a ratio best suited for a passing speed on the highway which can be adjusted to a driver's individual desires or set at a predetermined ratio independently of any other ratios to which the transmission is adjusted for other conditions of performance or operation.

A further object of the invention is to provide a transmission which has only one adjustment to control the relative speed range in which the engine and automobile speeds are brought into a predetermined ratio and can be changed to work to the best advantage under road conditions of "dry", "wet" or "icy."

A further object is to provide an automatic transmission which may be conveniently mounted at the end of the engine crank case, the driven shaft being coaxial with the engine crank shaft and turning at a predetermined speed ratio under full power conditions with respect thereto which can be one to one if desired.

Further objects and advantages of this invention will of course present themselves to those familiar with the art on reading the following specification in conjunction with the drawings and the appended claims:

In the drawings:

Fig. 1 is a section showing the construction of the transmission of this invention taken vertically through the main housing and vertically and laterally through the controls;

Fig. 2 is a section taken on line 2—2 of Fig. 1;

Fig. 3 is a schematic view of the various gear elements in the transmission;

Fig. 4 is a schematic view of a preferred form of hydraulic control valve block, the various elements being shown in the positions they occupy when the transmission is driving the vehicle forward at a low speed;

Fig. 5 is a view similar to Fig. 4 showing the elements in "neutral" position;

Fig. 6 is a view similar to Fig. 4 showing the elements in "reverse" position; and Fig. 7 is a partial section showing another form of the ratio control valve.

Fig. 8 is a vertical section similar to Fig. 1 showing another embodiment of the invention.

Fig. 9 is a view similar to Fig. 4 showing in "forward" "idling" the control system preferred for the embodiment shown in Fig. 8 but which can also be substituted for the arrangement shown in Fig. 4.

Fig. 10 is a view of the device shown in Fig. 9 showing the elements in "forward" speed at cruising speed.

Fig. 11 is a view of the device shown in Fig. 9 operating with "over-drive" characteristics.

Fig. 12 is a schematic view of the control panel of the transmission.

The fundamental principle of the transmission of this invention is to employ a plurality of planetary or epicyclic gear groups, one group for forward speeds and another for reverse, and control their action by a pair of positive displacement hydraulic pumps whose outflows are controlled with respect to each other and by the operator with respect to engine performance to apply maximum safe torque forces to the driven elements under a wide range of variable conditions.

Although the essential purpose of a transmission such as conventionally employed in motor vehicles is to enable an engine characterized by a low torque at low speeds to apply a high speed and high torque drive to a loaded driven shaft to accelerate and drive that shaft from low to high speeds, yet fulfill the desires of automobile drivers to have smooth and uninterrupted application of power, fast pickup at all speeds, especially low and car-passing speeds, simplicity of controls, service-free operation, quick adjustment for seasonal and local conditions, the "feel" of engine performance, safety against accidental movement of the control lever into neutral or reverse while going forward, and among other things, but not the least of them, economy in fuel consumption and cost, which things have burdened automotive engineers with extensive and complicated problems, the satisfacotry solutions of which have heretofore not been reached as evidenced by the many different transmissions which are in use and have been undergoing development for many years.

Without need for discussion at this time of the shortcomings of conventional transmissions, the advantages of the present invention will appear and be appreciated by those skilled in the art from the following description in which like numerals refer to identical parts and suffix letters indicate similar parts.

A preferred embodiment 10 of the present invention is illustrated in Figs. 1 to 3 and comprises a transmission housing 11 which is generally cylindrical in shape to economize on lubricant. The housing is provided with an opening 12 on one side or top in which a pump assembly 13 is mounted. One end of the housing 11 is open so that the various gears may be installed, and this end is covered by a circular plate 14 having a centrally located boss 15 which serves as a bearing support for the driven shaft 16. The pump assembly 13 being mountable as a unit, can be adjusted and set in connection with a master testing device (not shown) under simulated working conditions.

The opposite end of the housing 11 is provided with a flange 17 so that it may be bolted directly to the engine housing (not shown). A drive shaft is shown at 18, and although this shaft could be an extension of the engine crank shaft it preferably is a separate shaft splined to the engine shaft for rectilineal engagement and disengagement as journalled and carried in a boss 20 formed integrally with the housing 11. The boss 20 also serves as a bearing for a ring gear 21 carried by a plate 22 journalled on the inner end of the boss 20. In order to simplify the drawings, all of the bearings in the transmission have been illustrated as simple journals, it being understood that it is preferred to employ roller, needle or ball bearings, using oil seals where applicable, for all of the rotating members according to the conventional practice.

An integrally formed sun gear 23 is provided on the shaft 18 at the point where it emerges from the boss 20. This gear drives three circumferentially spaced planet gears 24 which also mesh with internal teeth on the orbital or ring gear 21. The planet gears are rotatably journalled on shafts 25 supported on a live cage or ring 26. Thus it will be apparent that the gears 21, 23 and 24 form a conventional planetary or epicyclic system.

The outside of the ring gear 21 is machined to have external teeth thereon meshing with a small pinion 27 which drives a conventional gear pump 28 disposed in the plate 13. This pump 28 when throttled serves as a variable positive brake to control the speed of rotation of the ring gear 21, and consequently controls the speed of rotation of the live ring 26. When the flow of fluid from the pump 28 is completely throttled, rotation of the ring gear 21 is checked and the live ring 26 is driven by the planet gears 24 and turns at a high speed though at a somewhat slower speed than the drive shaft depending upon the relative sizes of the gears 21, 23 and 24. When the flow of fluid is unopposed, the live ring 26 is free to move along with the ring gear 21 and will not transmit power. Thus the effective gear ratio between the shaft 18 and the live ring 26 may be varied over a wide range.

Each of the shafts 25 supported in the live ring 26 also carries rotatably thereon a second planet gear 30 whose teeth mesh with a fixed ring gear 31 secured to the housing 11. These second planet gears also mesh with a second sun gear 32, but this sun gear is journalled for free rotation on the drive shaft 18. In the embodiment illustrated in Fig. 1 the gear 32 is the same size as the drive gear 23, and the ring gear 31 is the same size as the internal gear 21. This results in a 1:1 ratio between the sun gears when the ring gear 21 is held stationary. The sizes of the gears 30, 31 and 32 may be varied, however, to change this ratio. If it is desired to have a higher engine to wheel overall ratio, as would be the case in an automobile intended to be driven in mountainous states, the planet gears 30 are made slightly smaller, the fixed ring gaer 31 being smaller and the sun gear 32 slightly larger. Conversely, to achieve an "over-drive" effect, the planet gears 30 and the ring gear 31 are made somewhat larger than the size shown, the diameter of the sun gear 32 being reduced. On the other hand, as shown in Fig. 8, the gears 21a and 24a may be smaller than gears 21 and 24, respectively, with respect to gears 31 and 30 and "over-drive" characteristics can be produced. Gears 24a and 30 need not be coaxial on shaft 25 but are shown thus with 23a correspondingly enlarged.

The gears described so far comprise forward speed components of the transmission, and when the sun gear 32 is connected to the driven shaft in rotary locked relationship a simple infinitely variable "forward speed" transmission results.

To effect reversing, an additional planetary group of gears is provided which serves the additional function of locking the forward speed components in drive relationship with the driven shaft 16 in "forward speed." In this group the planet gears 33 mesh with a ring gear 34 and a small sun gear 35 machined on the end of the drive shaft 18. The ring gear 34 is attached to a circular plate 36 integrally formed with the driven shaft 16. In this planetary group the planet or intermediate gears 33 instead of the ring gear 34 are coupled to a pump 38 so that their rotation about the axis of the sun gear 35 may be controlled. To effect this the planet gears are supported on a ring or cage 40 which is attached to the sun gear 32 and journalled for free rotation on the drive shaft 18. The outer periphery of the cage 40 is machined to have teeth 41 meshing with a pinion 42 which drives the gear pump 38.

The operation of the transmission as thus far described is as follows: With the drive shaft 18 rotating and the output of both gear pumps 28 and 38 unrestricted, the driven shaft 16 remains at rest, only a slight frictional load of idling gears being imposed on the engine.

Examining the reverse gearing under these conditions, it will be seen that the ring gear 34, being directly geared to the vehicle wheels, will tend to remain at rest and, with the cage gear 40 and ring gear 21 free to move, they will dissipate the speed differential between the drive and driven shafts by both rotating in opposite directions with respect to each other but in the same directions which they respectively tend to rotate when the outputs of their respective pumps are throttled. Thus the pump 28 controlling the "forward speed" components can be valved against backflow of liquid through it to eliminate or provide for "free-wheeling" as hereinafter described concerning the relationship in which the driven shaft overruns the drive shaft.

If it is desired to move the driven shaft 16 in the forward direction the flow from the pump 28 is restricted. This causes the ring gear 21 to slow down somewhat, and as it slows down the live ring 26 is caused to revolve at an increasing speed, carrying the planet gears 30 along with it. As the gears 30 are moved about the shaft 18 at increasing speeds, they react against the fixed ring gear 31 to cause the sun gear 32 to rotate faster and faster in the direction of rotation of the shaft 18 and thereby to reduce the speed differential between the cage 40 and the sun gear 35, to carry the planet gears 33 bodily along. This causes the ring gear 34 on the driven shaft 16 to start rotation at a slow speed. As the output of the pump 28 is further restricted, the speed of the driven shaft is further increased until the pump output is stopped completely, at which time the planet gears do not rotate on their own axes but are being carried bodily around as a drive interlock between the cage 40 and drive shaft on the one hand, and the ring gear 34 (driven shaft) on the other hand, in a 1 to 1 ratio in the embodiment illustrated in Fig. 1. As already mentioned, varying the relative sizes of gears 30, 31 and 32 will change the 1 to 1 ratio to provide a so-called over-or-under-drive arrangement as shown in Fig. 8. When this point is reached the circular plate 40 and the gears 32, 33 and 34 all turn as a unit with the shaft 18.

In reverse, the outlet of the "forward" pump 28 is left open and the outlet to the "reverse" pump 38 is progressively restricted. This causes the circular ring 40 to slow down, slowing the speed of revolution of the planet gears 33 about the shaft 18. As these gears are slowed down they cause the ring gear 34 and the shaft 16 to rotate in a direction opposite to that of the shaft 18. As the amount of restriction is increased, the speed of the driven shaft increases to a maximum when the ring 40 is stopped. In the embodiment illustrated in Fig. 1, the planet gears 33 have the same number of teeth as the sun gear 35 so that the maximum reverse speed is one-third of the drive shaft speed. This ratio has proved particularly desirable for use in automobiles where high power and low speed is desired when backing up. However a 1:1 ratio embodiment is illustrated in Fig. 8.

From the foregoing it will be apparent that merely by controlling valves in the output conduits of the pumps 28 and 38 it is possible to vary the speed of the driven shaft 16 from the same speed as the drive shaft 18 through neutral to one-third (or 1:1 ratio) the speed of the drive shaft 18 in the opposite direction.

An arrangement for controlling the pump outputs is shown schematically in Figs. 1 and 4 to 6. The valves are housed in a unitary block indicated at 50 in Fig. 1. Actually the valve block may be located anywhere, it being merely a balancing of convenience against conduit piping. It could be, for example, located on the steering column, if desired, where adjustments could be made readily by the driver for fast or slow "pickup" operation. The housing 11 serves as an oil reservoir, and the pumps 28 and 38 are illustrated as being within the valve block 50 where their intakes are submerged at all times. The pumps are preferably located in the transmission housing and connected to the block 50 by piping, indicated at 51 in Fig. 1, or by mating parts, if desired.

The valve block 50 has a sealed chamber 52 therein, and several passages open into the chamber 52. The high pressure side of the forward speed control pump 28 is connected by a passage 53 to the chamber 52, and the high pressure side of the reverse control pump 38 is connected by a similar passage 54. Intermediate these passages a third passage 55 extending to the reservoir is provided.

Within the chamber 52 a slidably mounted valve member 56 is provided having a grooved passage 57 for selectively connecting either of the inlet passages 53 or 54 to the reservoir through the passage 55. Two other passages 60 and 61 through the member 57 are also provided for selectively connecting either of the inlet passages 53 or 54 to the interior of the chamber 52.

Remote from the valve 56 the chamber 52 is provided with a valve port 62. This port opens into a passage 63 extending to the reservoir. To control the flow of fluid out of the chamber 62, a second valve member 64 is provided which serves to seal the valve port 62 when moved inwardly. The member 64 is preferably connected by a linkage to the accelerator pedal of the engine and so arranged as to close the valve completely when the engine is running at a speed which would drive the automobile in excess of a predetermined speed such as twenty miles per hour. In other cases it may prove desirable to position the valve member 64 according to the torque load upon the engine so as to provide the fuel which is needed to enable the engine to assume its load.

What has been said about the embodiment shown in Figs. 4, 5 and 6 can be said about the preferred embodiment shown in Figs. 9, 10, 11 wherein is added a valve by-pass bleed valve 80 actuated by a suitable manually controlled cam 81 which varies the opening of the valve for purposes hereinafter described in connection with Fig. 12.

In Figs. 4, 9, 10 and 11 the slide valve member 56 is shown in the position it occupies when the vehicle is moving forward. The outlet of the pump 28 is connected by the passage 60 to the chamber 52 so that the flow from the pump is controlled by the plunger valve 64 and the other valves as hereafter described. The outlet of the reverse control pump is connected to the reservoir by the passage 55. Thus the gears of the reverse pump 38 may turn freely while those of the forward pump are subjected to a back pressure which resists their rotation. This causes the ring gear 21 to be slowed down and operate to move the vehicle forward. If the port 62 is closed all the way, the ring gear will be stopped with all the other valves closed and the driven shaft 16 will turn at the same speed as the drive shaft 18, as already described.

In "neutral" the valve member 56 is positioned as shown in Fig. 5 so that the outputs of both pumps 28 and 38 are connected to the reservoir. With the valve member 56 in this position both pumps may rotate freely.

In Fig. 6 the valve member is positioned for "reverse." The pump 38 is connected to the chamber 62 and the forward pump is connected to the reservoir so that rotation of the ring gear 21 is free while the plate 40 is braked to cause the driven shaft to rotate in the opposite direction.

The valve member 56 is preferably positioned by a control shaft 58 and crank arm 59 which projects into the chamber through the passage 55. Thus no packed seal is required since no pressure is present in this passage leading to the reservoir.

Under those driving conditions where the speed of the automobile overruns the speed of the engine, as where the car is going down hill, the transmission thus far described will provide for "free wheeling," a relationship commonly referred to when an idling engine is free of the torque effect of a rolling car. However, where "free wheeling" is illegal, and where the driver desires to have the idling engine serve as a brake on the automobile, the inlet conduit 66 leading from the reservoir to the forward pump 28 may be provided with a backflow check valve 65 which may entirely or only partially block the backflow. If only partially blocked, the engine will still serve as a brake but will rotate at a lower speed with less likelihood of gas and lubricant waste through the engine. The use of the backflow check valve 65 has proved very satisfactory because it too can be adjusted according to the desires of the driver. However, anti-reversing mechanical devices could be used. A conduit 67 similar to the conduit 66 connects the inlet of the "reverse" pump 38 to the reservoir.

In order to prevent damage to the gears and permit rapid acceleration or quick reversing, a spring or centrifugally loaded relief valve 68 may be provided which permits fluid to flow out of the chamber 52 in the event the pressure exceeds a predetermined value. Since the pressure exerted by either pump depends on the torque load on the gears, the safety valve 68 serves to protect the gears against damage. Such a valve is illustrated in Fig. 1 where the countershaft 73 of the gear pump 28 is hollow and is placed in connection at one end with the pressure side of the pump by a recess 74 in the pump head 75. The other end of the shaft terminates within the pump body and opens into a cavity 76 having an outlet valve port 68 therein disposed substantially and preferably coaxial with the corresponding countershaft 76 of the other pump 38. This other countershaft 76 is exposed at one end to drive a cage 78 having centrifugal flyballs 80 thereon which displace actuating arms 81 in an axial direction as the countershaft 76 speeds up. Between the arms 81 and the port 68 a two-piece valve member 82 is provided comprising two telescoping members with a compression spring 83 between them tending to force closure of the valve 68 as backed up by the resting position of the arms 81. Thus when rotation of the shaft 16 is at a low speed, the spring serves as a pressure relief determinant when the back pressure in the chamber 52 is too great in forward speeds.

Furthermore, as the pump 28 is slowed by throttling, the speed of the drive shaft 16 increases and the speed of the countershaft 76 greatly increases causing the flyballs 80 to collapse the spring 83 to bring the two telescoping members into solid engagement. Thereafter above a selected speed, such as twenty miles per hour, where the engine can operate in selected or predetermined high speed drive relationship with the automobile propeller or driven shaft 16 the opening of the valve 68 is resiliently controlled in relation to the centrifugal effect of the flyballs. Thus the higher the vehicle speed, the less need there will be and also the less likelihood that the valve 68 will open.

In this connection it should be noted that although the valve 82 appears to be located where interference mechanically might occur with the gear elements, the countershafts 76 and 73 are in fact spaced radially from the axis of rotation of the shafts 16 and 18 as the drive shafts of the respective pumps.

A small bleed valve 72 (Fig. 7) is preferably provided between the pressure chamber 52 and the reservoir return 63 which is opened when the accelerator is pressed clear to the floor beyond its normal working range. This operates to let the engine speed up a little with respect to the car speed so that extra power can be provided at "passing speeds" if desired. Although shown in connection with a modified main valve form, the valve 72 is employed wherever it is desired to have the "extra passing power."

In Fig. 7 a modified embodiment is shown in which the ratio control valve and the check valve are combined in a single valve 64a by the simple expedient of providing a resilient spring 70 in the valve control linkage 71. Should the pressure at any time become excessive, the spring 70 will be compressed, permitting the valve 64a to open wider independently of the linkage 71. This arrangement results in extremely smooth operation of the vehicle.

The control lever for the valve actuator 57 (Fig. 6) is not shown but can be a conventional arm located on the steering column of the automobile where (Fig. 12) "neutral" is any predetermined position 83, "reverse" can be the farthest counter-clockwise position 84, and "forward" speeds are over a range of positions 85. A shoulder preferably is located between the neutral and reverse positions so that a wilful attempt has to be made to get into reverse from neutral position. However, even if the control lever were to be moved into reverse accidentally, nothing would happen if the motor was idling. If under power the motor might be stalled or serve as an extra emergency brake upon the forward momentum of the car, safety valves would open if the hydraulic pressure became excessive, but other than this the car would come to a stop and begin backing up if the accelerator were not released.

Furthermore, with the present embodiment an automobile having this transmission can be pushed to start the motor without deleterious effects. The backflow check valve 65 operates to apply torque to the shaft 18 as described in connection with the automobile overrunning the engine. The operation of the present invention is not dependent upon engine developed hydraulic pressures because the hydraulic pressure to establish the drive can be attained by either the drive or driven shaft being driven.

Adjustment with respect to slow or fast pickup can be made with respect to the tension of the spring 70 or the relative degree of opening provided at the valve 64 in relationship to any particular position of the automobile accelerator.

In this connection the valve 80a may by suitable detent positioning control (not shown) be located in cooperation with an indicator 86 in a number of different positions to obtain different results with the transmission by shifting the cam 81a. In one position with the indicator 86 on the steering column moved to the "dry" position 87, the valve 80a is preferably held wide open by the cam 81 to give a higher engine speed to drive the wheels with greater torque effort for brilliant acceleration (Fig. 10). This acceleration can be augmented even further with the accelerator fully depressed because the passing valve 72 will then be opened, giving even higher torque effort.

With the indicator 86 in "wet" position 88 the torque effort of engine drive to the wheels is decreased so that there is less opportunity of spinning the wheels, it being remembered that the main operating characteristics of the transmission are under the control of the accelerator pedal once a "position" of the cam and indicator is selected by the driver. In brief, when a driver subconsciously senses the revolutions per minute desired upon the wheels, the less the accelerator has to be depressed to attain such effectively without slippage, the more the valve 80 is closed.

When the indicator is in "icy" position 89, the transmission is operating in what conventionally could be referred to as "third gear." This provides lesser torque to wheel to prevent slipping on ice or snow. The valve 80 is almost closed and the torque effort is in relation to a 1:1 ratio with the embodiment shown in Fig. 8, or less than a 1:1 with the embodiment shown in Fig. 4, it being appreciated that with the present invention, any system of valve control 50 can be associated with the outlet passages 53 and 54 or interchanged and adjusted quickly to control the operation of the gearing in any manner desired; truck, passenger car, or even railroad locomotive.

When the indicator is in "country" position 90, the valve 80 is completely closed (Fig. 11), and the effect of "overdrive" is attained for fuel economy or high vehicle speed at low engine speed.

In all positions, the "passing speed" is available at all times merely by depressing the accelerator to the floor.

In event speed control is desired in "reverse" the same as forward, then the bevel gear differential gearing 33a, 34a, 35a, Fig. 8, can be substituted for the gears 33, 34, 35 in Fig. 1. Forward and reverse are then both infinitely variable to a 1:1 ratio. In this respect the bevel gears 33a, 34a, 35a operate in the same way as the gears 33, 34 and 35 previously described except that the shaft speed ratio between the drive shaft 18a and the driven shaft 16 is 1:1 when the "reverse" pump 38 is locked up by full closure of all valves: 64, 68, 72 (Fig. 4), 64a, 72 and 80 (Fig. 9).

Consequently various changes or modifications in addition to those described herein may be made without departing from the spirit of this invention whose scope is commensurate with the following claims.

What is claimed is:

1. A transmission comprising a drive shaft, a planetary gear system including a sun gear driven by said shaft, a planet gear and a ring gear, means for applying varying braking loads to the ring gear of said system, a second planetary including a sun gear, a planet gear and a ring gear, the ring gear of the second system being restrained against rotation and the sun gear being freely rotatable with respect to said drive shaft, a live element supporting the planet gears of both of said systems whereby motion of one set of planet gears is transmitted to the other, a third planetary system including a sun gear, a ring gear and planet gears, said planet gears being supported on an element driven by the sun gear of the second planetary system, means for applying varying braking loads on said element, the sun gear of said third planetary system being driven by said drive shaft, and a driven shaft connected to the ring gear of the third planetary system.

2. A transmission comprising a drive shaft, a planetary gear system including a ring gear, a planet gear and a sun gear driven by said shaft, means for applying varying breaking loads to the ring gear of said system, a second planetary system including sun, planet and ring gears, the ring gear of the second system being fixed, a live element supporting the planet gears of both of said systems whereby motion of translation of a planet gear of one system is transmitted to a planet gear of the other, a third planetary system including a sun gear, ring gear and planet gears supported on an element driven by the sun gear of the second planetary system, means for applying varying braking loads on said element, the sun gear of said third planetary system being driven by said drive shaft, and a driven shaft connected to the ring gear of the third planetary system.

3. A transmission comprising a drive shaft, a planetary gear system including a ring gear, a planet gear and a sun gear driven by said shaft, means for applying varying braking loads to the ring gear of said system, a secondary planetary system including sun, planet and ring gears, the ring gear of the second system being fixed and the sun gear being freely rotatable with respect to said drive shaft, means for connecting the planet gears of both of said systems whereby rotation of one set of planet gears is transmitted to the other, and a third planetary system including sun, planet and ring gears, the planet gears being supported on an element driven by the sun gear of the second planetary system, the sun gear of said third planetary system being driven by said drive shaft and the ring gear thereof constituting the power output element of the transmission.

4. A transmission comprising a drive shaft, a planetary gear system including a ring gear, a planet gear and a sun gear driven by said shaft, means for applying varying braking loads to the ring gear of said system, a second planetary system including sun, planet and ring gears, the ring gear of the second system being fixed and the sun gear being freely rotatable with respect to said drive shaft, means for connecting the planet gears of both of said systems, whereby rotation of one set of planet gears is transmitted to the other, a third planetary system including a sun gear, a ring gear and planet gears supported on an element driven by the sun gear of the second planetary system, means for applying varying braking loads on said element, the sun gear of said third planetary system being driven by said drive shaft, and a driven shaft connected to the ring gear of the third planetary system.

5. A transmission comprising a drive shaft, a differential gear system including a drive gear driven by said shaft, a driven gear and an intermediate gear, means for applying varying braking loads to a gear of said train, a second differential system including a fixed gear, a freely rotatable driven gear and an intermediate gear, a live element supporting the intermediate gears of both of said trains whereby motion of an intermediate gear of one train is transmitted to the intermediate gear of the other train, a third differential system including a driven gear, an intermediate gear and a drive gear supported by an element driven by said driven gear of the second differential system, means for applying varying braking loads on said element, another gear of said third differential system being driven by said drive shaft, and a driven shaft connected to the third gear of the third differential system.

6. A transmission comprising a drive shaft, a planetary gear system including a sun gear driven by said shaft, a planet gear and a ring gear, a hydraulic pump applying varying braking loads to the ring gear of said system, said pump being driven by the ring gear, a second planetary system including a sun gear, a planet gear and a ring gear, the ring gear of the second system being fixed and the sun gear being freely rotatable with respect to said drive shaft, means for connecting the planet gears of both of said systems whereby rotation of one set of planet gears is transmitted to the other, a third planetary system including ring, planet and sun gears whose planet gears are supported on an element driven by the sun gear of the second planetary system, the sun gear of said third planetary system being driven by said drive shaft, a driven shaft connected to the ring gear of the third planetary system, and valve means for varying the hydraulic output of said pump to control the relative speed of rotation of said driven shaft.

7. A transmission comprising drive and driven shafts, a planetary gear system including a ring gear, a planet gear and a sun gear driven by said drive shaft, a pump connected to the ring gear of said planetary system in drive relationship, a second planetary system including a planet gear, a fixed ring gear and a freely rotatable sun gear, a rotary member driven by the planet gears of said first system and supporting the planet gears of the second system whereby rotation of the planet gears of the first system about the axis of the sun gear is transmitted to the planet gears of said second system, a third planetary system including planet gears, a ring gear connected to the driven shaft and a sun gear driven by the drive shaft, the planet gears of the third system being supported on an element connected to the sun gear of the second planetary system, brake means for applying a varying load on said element, and valve means for restricting the fluid output of said pump to control the output of said transmission.

8. A transmission comprising drive and driven shafts, a planetary gear system including a ring gear, a planet gear and a sun gear driven by said drive shaft, a pump connected to the ring gear of said planetary system in driven relationship, a second planetary system including planet gears, a fixed ring gear and a freely rotatable sun gear, means for connecting the planet gears of said second system being connected to the planet gears of the first system whereby rotation of the planet gears of the first system about the axis of the sun gear is transmitted to the planet gears of said second system, a third planetary system including planet gears, a ring gear connected to the driven shaft and a sun gear driven by the drive shaft, the planet gears of the third system being supported on an element connected to the sun gear of the second planetary system, a second pump connected to said element in drive relationship, and valve means for restricting the fluid outputs of said pumps to control the output of said transmission.

9. A transmission comprising drive and driven shafts, a planetary gear system including a ring gear, a planet gear and a sun gear driven by said drive shaft, a pump connected to the ring gear of said planetary system in drive relationship, a second planetary system including planet gears, a fixed ring gear and a freely rotatable sun gear, a rotary member driven by the planet gears of said first system and supporting the planet gears of the second system whereby rotation of the planet gears of the first system about the axis of the sun gear is transmitted to the planet gears of said second system, a third planetary system including planet gears, a ring gear connected to the driven shaft and a sun gear driven by the drive shaft, the planet gears of the third system being supported on an element connected to the sun gear of the second planetary system, a centrifugal flyball element driven by said element, and a spring loaded valve means for restricting the fluid output of said pump to control the output of said transmission, the loading of said spring being controlled by said flyball element.

10. A transmission comprising a drive shaft, a planetary gear system including a ring gear, planet gears and a sun gear driven by said shaft, a pump connected to the ring gear of said planetary system in driven relationship, a second planetary system including a fixed ring gear, planet gears and a freely rotatable sun gear, means for connecting the planet gears of said second system being connected to the planet gears of the first system whereby rotation of the planet gears of the first system about the axis of the sun gear is transmitted to the planet gears of said second system, a third planetary system including planet gears, a ring gear connected to the driven shaft and a sun gear driven by the drive shaft, the planet gears of the third system being supported on an element connected to the sun gear of the second planetary system, a second pump connected to said element in drive relationship, manually controlled valve means for restricting the fluid outputs of said pumps to control the output of said transmission, a spring loaded safety valve independent of said manually controlled valve means for relieving the pressure output of said first mentioned pump, and a centrifugal flyball member driven by said element for varying the loading on said safety valve with changes in the speed of rotation of said element.

11. In a transmission the combination including a drive shaft, an epicyclic gear train including drive, driven and intermediate gear elements, means for driving one gear element of said train from said drive shaft, a pump connected so as to be driven by another element of said train whereby varying braking loads may be imposed to restrict rotation of the second element, a second epicyclic gear train including drive, driven and intermediate gear elements, means for driving one element of said second train from said drive shaft, a second element of said second train being driven by third element of the first train, a second pump connected to said second element of said second train whereby varying braking loads may be imposed thereon, a driven shaft connected to the third element of said second train, a manually controlled valve for controlling the hydraulic outputs of said pumps to vary the torque and speed output as well as the direction of rotation of said driven shaft, and a relief valve in the outlet conduit of the first mentioned pump for releasing the pressure to lower the overall gear ratio when excessively high torque loads are imposed upon the drive shaft.

12. A transmission having concentric drive and driven shafts, one of said shafts having two gears thereon rotating at the same speed one of which is a sun gear, a second sun gear journalled coaxially with said shafts, a cage rotatable on said axis of rotation, a planet gear meshing with the first sun gear, a second planet gear meshing with the second sun gear, said planet gears being journalled on said cage and movable bodily with the cage, means for controlling the speed of rotation of said cage including a ring gear in mesh with one of the planet gears and normally free to rotate when one of said shafts is rotating and the other of said shafts is stationary, a second ring gear in mesh with the second planet gear, means for braking said ring gears to rotate said sun gears in the same direction, means responsive to any speed differential existing at any time between said sun gears including an epicyclic gear assembly in which one of the gears of the gear assembly is the other one of the first said two gears and another gear of the gear assembly is carried by the second sun gear and another gear of the gear assembly is carried by the other of said shafts, and means for braking said second sun gear selectively and alternatively with the first braking means.

13. A transmission having concentric drive and driven shafts, one of said shafts having two sun gears rotating at the same speed, a third sun gear journalled coaxially with said shafts, a cage rotatable on said axis of rotation, a planet gear meshing with one of the first two sun gears, a second planet gear meshing with the third sun gear, said planet gears being journalled on said cage and movable bodily with the cage, means for controlling the rotation of said cage including a ring gear normally free to rotate in mesh with one of the planet gears, a second ring gear in mesh with the second planet gear, means for braking said ring gears to rotate said third sun gear in the same direction as said two sun gears, means interconnecting said shafts including a gear responsive to any speed differential existing between said third sun gear and said two sun gears and responsive to rotation of said three sun gears for transmitting power from one of the shafts to the other, and means controlling said braking means for actuating the braking means continuously to brake said ring gears to drive the driven shaft.

14. A transmission having concentric drive and driven shafts, one of said shafts having two sun gears rotating at the same speed, a third sun gear journalled coaxially with said shafts, a cage rotatable on said axis of rotation, a planet gear meshing with one of the first two sun gears, a second planet gear meshing with the third sun gear, said planet gears being journalled on said cage and movable bodily with the cage, means for controlling the rotation of said cage including two ring gears, one in mesh with one of the planet gears and the other in mesh with the second planet gear, means for controlling rotation of said ring gears including an element for supplying a variable braking force to one of said ring gears to rotate said third sun gear in the same direction as said two sun gears, and means interconnecting said shafts including a gear responsive to any speed differential existing between said third sun gear and said two sun gears for transmitting power from one of the shafts to the other when said braking force is applied.

15. A transmission having a drive and a driven shaft, the combination of a planetary gear system including a sun gear, a planetary gear and a ring gear, a second planetary gear system including a sun gear, a planet gear and a ring gear, means for braking one of the ring gears, a live element supporting the planet gears of both of said systems whereby bodily displacement of one set of planet gears is transmitted to the other set of planet gears, one of said sun gears being driven by the drive member and the other sun gear being freely rotatable with respect to said driving member, a third planetary system including a sun gear, a ring gear and planet gears one of which is driven by the drive shaft, another of which is driven by the second sun gear and the third of which is carried by the driven shaft, means responsive to the speed of the element driven by the second sun gear for supplying variable braking force to the ring gear of the first planetary system.

16. A transmission having concentric drive and driven shafts, one of said shafts having two gears thereon rotating at the same speed one of which is a sun gear, a second sun gear journalled coaxially with said shafts, a cage rotatable on said axis of rotation, a planet gear meshing with the first sun gear, a second planet gear meshing with the second sun gear, said planet gears being journalled on said cage and movable bodily with the cage, means for controlling the speed of rotation of said cage including a ring gear in mesh with one of the planet gears and normally free to rotate when one of said shafts is rotating and the other of said shafts is stationary, a second ring gear in mesh with the second planet gear, said first sun gear, planet gear and ring gear associated therewith being of a different overall ratio than said second sun gear, planet gear and ring gear associated therewith, means for braking said ring gears to rotate said sun gears in the same direction, means responsive to any speed differential existing at any time between said sun gears including an epicyclic gear assembly in which one of the gears of the gear assembly is the other one of the first said two gears and another gear of the gear assembly is carried by the second sun gear and another gear of the gear assembly is carried by the other of said shafts, and means for braking said second sun gear selectively and alternatively with the first braking means.

17. A transmission having concentric drive and driven shafts, one of said shafts having two gears thereon rotating at the same speed one of which is a sun gear, a second sun gear journalled coaxially with said shafts, a cage rotatable on said axis of rotation, a planet gear meshing with the first sun gear, a second planet gear meshing with the second sun gear, said planet gears being journalled on said cage and movable bodily with the cage, means for controlling the speed of rotation of said cage including a ring gear in mesh with one of the planet gears and normally free to rotate when one of said shafts is rotating and the other of said shafts is stationary, a second ring gear in mesh with the second planet gear, means for braking said ring gears to rotate said sun gears in the same direction including a pump having a back flow check valve in its inlet and a variable flow control valve in its outlet, means responsive to any speed differential existing at any time between said sun gears including an epicyclic gear assembly in which one of the gears of the gear assembly is the other one of the first said two gears and another gear of the gear assembly is carried by the second sun gear and another gear of the gear assembly is carried by the other of said shafts, and means for braking said second sun gear selectively and alternatively with the first braking means.

18. A transmission having concentric drive and driven shafts, one of said shafts having two gears thereon rotating at the same speed one of which is a sun gear, a second sun gear journalled coaxially with said shafts, a cage rotatable on said axis of rotation, a planet gear meshing with the first sun gear, a second planet gear meshing with the second sun gear, said planet gears being journalled on said cage and movable bodily with the cage, means for controlling the speed of rotation of said cage including a ring gear in mesh with one of the planet gears and normally free to rotate when one of said shafts is rotating and the other of said shafts is stationary, a second ring gear in mesh with the second planet gear, said first gear, planet gear and ring gear associated therewith being of a different overall ration than said second sun gear, planet gear and ring gear associated therewith, means for braking said ring gears to rotate said sun gears in the same direction including a pump having a back flow check valve in its inlet and a variable flow control valve in its outlet, means responsive to any speed differential existing at any time between said sun gears including an epicyclic gear assembly in which one of the gears of the gear assembly is the other one of the first said two gears and another gear of the gear assembly is carried by the second sun gear and another gear of the gear assembly is carried by the other of said shafts, and means for braking said second sun gear selectively and alternatively with the first braking means.

19. A transmission having concentric drive and driven shafts, one of said shafts having two gears thereon rotating at the same speed one of which is a sun gear, a second sun gear journalled coaxially with said shafts, a cage rotatable on said axis of rotation, a planet gear meshing with the first sun gear, a second planet gear meshing with the second sun gear, said planet gears being journalled on said cage and movable bodily with the cage, means for controlling the speed of rotation of said cage including a ring gear in mesh with one of the planet gears and normally free to rotate when one of said shafts is rotating and the other of said shafts is stationary, a second ring gear in mesh with the second planet gear, means responsive to any speed differential existing at any time between said sun gears including an epicyclic gear assembly in which one of the gears of the gear assembly is the other one of the first said two gears and another gear of the gear assembly is carried by the second sun gear and another gear of the gear assembly is carried by the other of said shafts, and hydraulic means for braking said second sun gear and said ring gears selectively and alternatively including a selector valve and a flow control valve.

20. A transmission comprising a drive shaft, a planetary gear system including a ring gear, a sun gear driven by said shaft and a planet gear in mesh with the ring gear and the sun gear, said planet gear being rotatably mounted on a carrier, a pump connected to the ring gear of said planetary system in drive relationship, another planetary system including planet gears, a ring gear in mesh therewith and connected to a driven shaft and a sun gear driven by the drive shaft in mesh with said latter planet gears, said planet gears of the other system being supported on a live element, means including said carrier driven by the first planetary system for bodily rotating said live element, a centrifugal flyball element driven by said live element, and a spring loaded valve means for restricting the fluid output of said pump to control the torque output of said transmission, the loading of said spring being controlled by said flyball element.

21. A transmission comprising a drive shaft, a planetary gear system including a ring gear, a sun gear driven by said shaft and planet gears in mesh with the ring gear and the sun gear, said planet gear being rotatably mounted on a carrier, a pump connected to the ring gear of said planetary system in driven relationship, another planetary system including planet gears, a ring gear in mesh therewith and connected to a driven shaft and a sun gear driven by the drive shaft in mesh with said latter planet gears, said planet gears of the other system being supported on a live element journalled concentric with said driven shaft, means including said carrier driven by the first planetary system for rotating said live element, a second pump connected to said element in drive relationship, manually controlled valve means for restricting the fluid outputs of said pumps to control the torque output of said transmission on the drive shaft, a spring loaded safety valve independent of said manually controlled valve means for relieving the pressure output of said first-mentioned pump, and a centrifugal flyball member driven by said element for varying the loading on said safety valve with changes in the angular velocity of said element.

22. In a transmission the combination including a drive shaft, an epicyclic gear train including coacting drive, driven and intermediate gear elements, means for driving one gear element of said train from said drive shaft, a pump means connected so as to be driven by another element of said train whereby varying braking loads may be imposed to restrict rotation of the second element, a second epicyclic gear train including coacting drive, driven and intermediate gear elements, means for driving one element of said second train from said drive shaft, means for driving the second element of said second train from the third element of the first train, a second pump means connected to said second element of said second train whereby varying braking loads may be imposed thereon, a driven shaft connected to the third element of said second gear train, and valve means for controlling the hydraulic outputs of said pumps to vary the torque and speed output as well as the direction of rotation of said driven shaft.

23. A transmission having concentric drive and driven shafts, one of said shafts having two sun gears rotating at the same speed, a third sun gear journalled coaxially with the said shafts, a spider cage journalled for rotation about the axis of rotation of the shafts, a planet gear meshing with one of the first two sun gears a second planet gear meshing with the third sun gear, said planet gears being journalled on said cage and movable bodily with the cage, means for controlling the relative rotation of one of said planet gears for controlling the speed of rotation of said cage with respect to said one of the first two sun gears including a ring gear meshing with the first planet gear normally free to rotate and a brake therefor, and reaction means effective on the other of said planet gears rotatably mounted in said cage whereby said two sun gears as a unit and the third sun gear rotating in the same direction at speeds varying in relation to the relative braking force applied by said controlling means, and means interconnecting one of said two sun gears and the driven shaft including a planetary gear bodily carried by said third sun gear in mesh with one of said two sun gears and with gear means on the driven shaft.

24. A transmission having a drive and a driven shaft, the combination of a planetary gear system including a sun gear, a ring gear and a planetary gear in mesh with the ring gear and the sun gear, a second planetary gear system including a sun gear rotatably mounted on a carrier, a ring gear and a planet gear in mesh with the ring gear in the last sun gear, means for braking said ring gears, a live element rotatably supporting the planet gears of both of said systems whereby bodily displacement of one set of planet gears is transmitted to the other set of planet gears, one of said sun gears being driven by the drive member and the other sun gear being freely rotatably with respect to said driving member, a third planetary system including a sun gear, a ring gear and planet gears in mesh therewith one of which is driven by the drive shaft, another of which is driven by the second sun gear and the third of which is carried by the driven shaft, means connecting the second sun gear to the second driven shaft, and speed responsive means operated by said connecting means for applying a varaible braking force to said first ring gear.

References Cited in the file of this patent

UNITED STATES PATENTS

| | | |
|---|---|---|
| 1,383,988 | De Normanville | July 5, 1921 |
| 2,007,279 | McCleary | July 9, 1935 |
| 2,069,408 | Forichon | Feb. 2, 1937 |
| 2,137,778 | McCullough | Nov. 22, 1938 |
| 2,186,108 | Holloway | Jan. 9, 1940 |
| 2,377,400 | Campbell | June 5, 1945 |
| 2,618,175 | Bruce | Nov. 18, 1952 |